(12) United States Patent
Huang et al.

(10) Patent No.: US 7,755,234 B2
(45) Date of Patent: Jul. 13, 2010

(54) BRUSHLESS MOTOR HAVE A VARIETY OF ROTATING ANGLES FOR BEING USED IN DIFFERENT LAMPS

(76) Inventors: Hsian-Yi Huang, P.O. Box 90, Tainan City 70499 (TW); Hsiu-Ming Huang, P.O. Box 90, Tainan City 70499 (TW)

( * ) Notice: Subject to any disclaimer, the term of this patent is extended or adjusted under 35 U.S.C. 154(b) by 370 days.

(21) Appl. No.: 11/936,096

(22) Filed: Nov. 7, 2007

(65) Prior Publication Data
US 2009/0115270 A1    May 7, 2009

(51) Int. Cl.
*H02K 5/04* (2006.01)
(52) U.S. Cl. .......................................... 310/83; 362/531
(58) Field of Classification Search ................. 362/465, 362/466, 523, 423, 531, 464; 242/155; 310/83
See application file for complete search history.

(56) References Cited

U.S. PATENT DOCUMENTS

| 4,526,329 | A | * | 7/1985 | Takeda | 242/155 M |
| 6,010,237 | A | * | 1/2000 | Gotou | 362/460 |
| 6,623,147 | B2 | * | 9/2003 | Hayami et al. | 362/467 |
| 6,634,773 | B2 | * | 10/2003 | Hayami | 362/464 |
| 6,698,911 | B2 | * | 3/2004 | Naganawa et al. | 362/464 |
| 6,984,060 | B2 | * | 1/2006 | Baba et al. | 362/467 |
| 7,121,706 | B2 | * | 10/2006 | Takiguchi et al. | 362/524 |
| 2003/0169587 | A1 | * | 9/2003 | Uchida | 362/37 |

* cited by examiner

*Primary Examiner*—Quyen Leung
*Assistant Examiner*—Naishadh N Desai (57) ABSTRACT

A brushless motor includes a bottom base, a circuit board, a rotator, a big gear, a big driven gear, a driving gear and a lid. Positioned around a shaft base inside the bottom base are two stopping posts that form an included angle with the shaft base. A positioning plate is formed at the bottom of the driving gear, restricted to move between the two stopping posts to keep the driving gear rotated in a preset angle. And, a single injection mold can make various bottom bases with diverse rotating angles for being used in the brushless motor employed for different lamps, achieving the purpose of reducing manufacturing cost.

1 Claim, 9 Drawing Sheets

BRUSHLESS MOTOR HAVE A VARIETY OF ROTATING ANGLES FOR BEING USED IN DIFFERENT LAMPS

BACKGROUND OF THE INVENTION

1. Field of the Invention

This invention relates to a brushless motor, particularly to one manufactured by a single mold to have a variety of rotating angles for being used in different lamps, achieving the purpose of reducing manufacturing cost.

2. Description of the Prior Art

Figure 1:
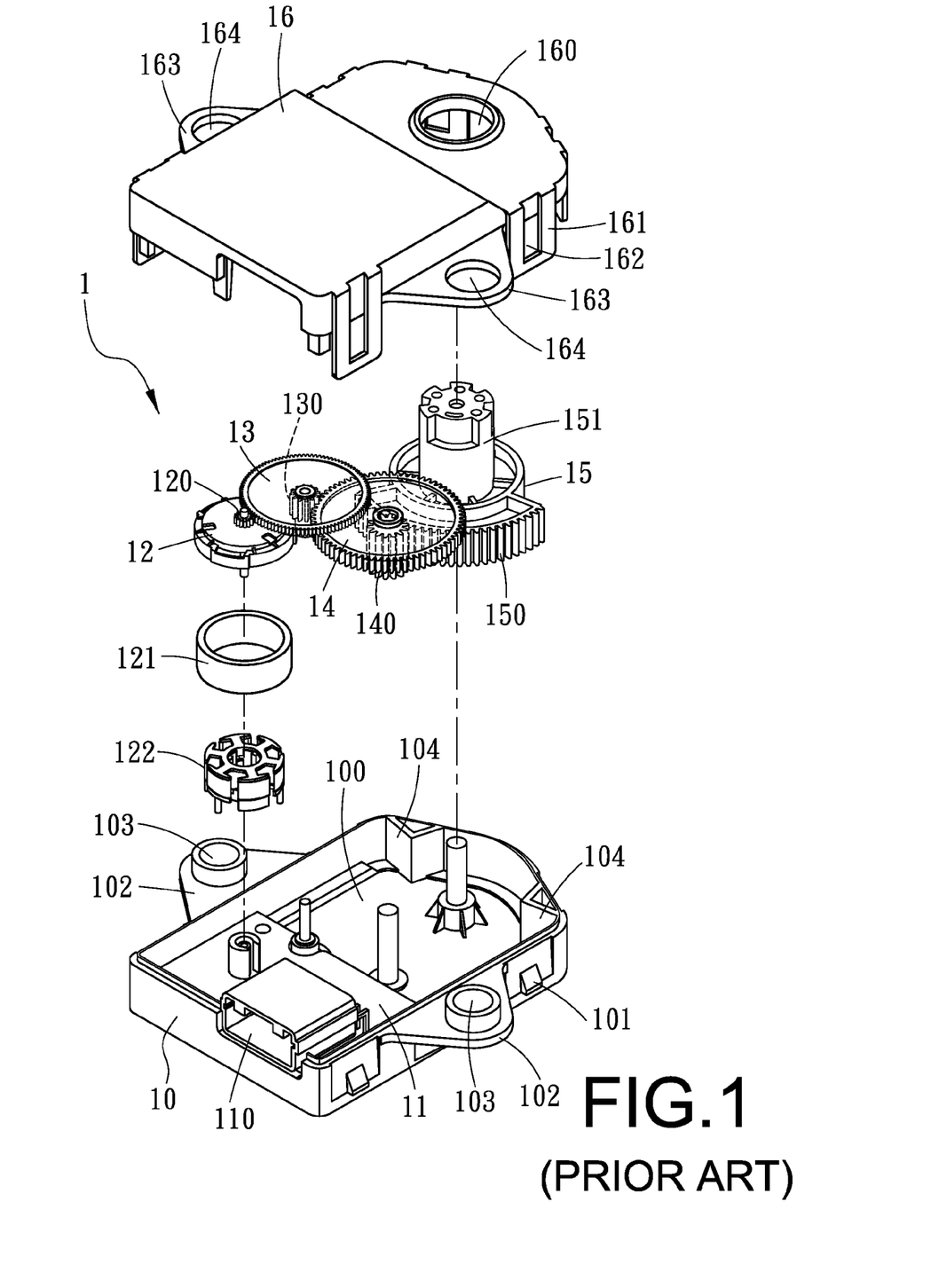
FIG. 1 is an exploded perspective view of a conventional brushless motor.
Figure 2:
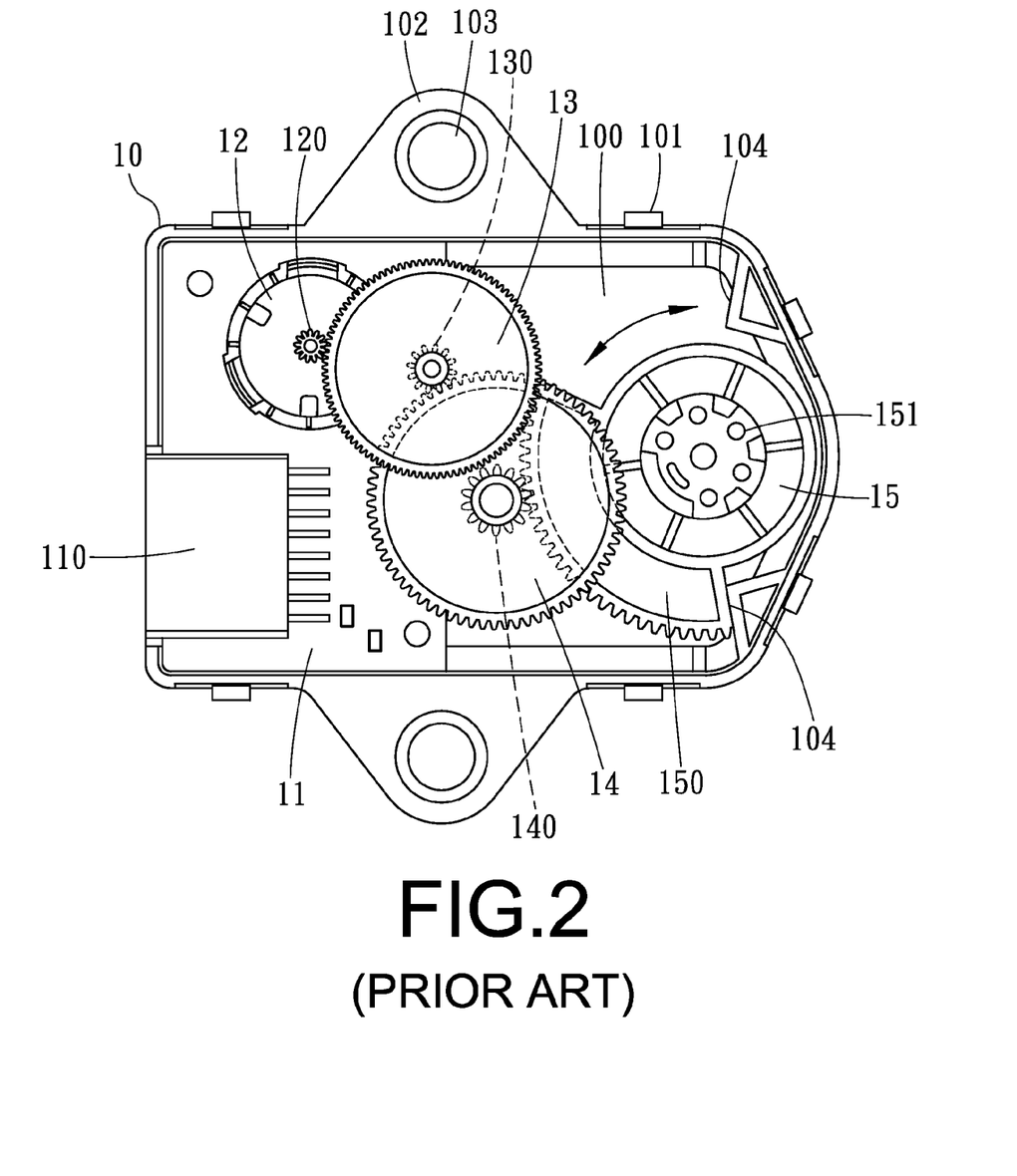
FIG. 2 is a top view of the conventional brushless motor.
Figure 3:
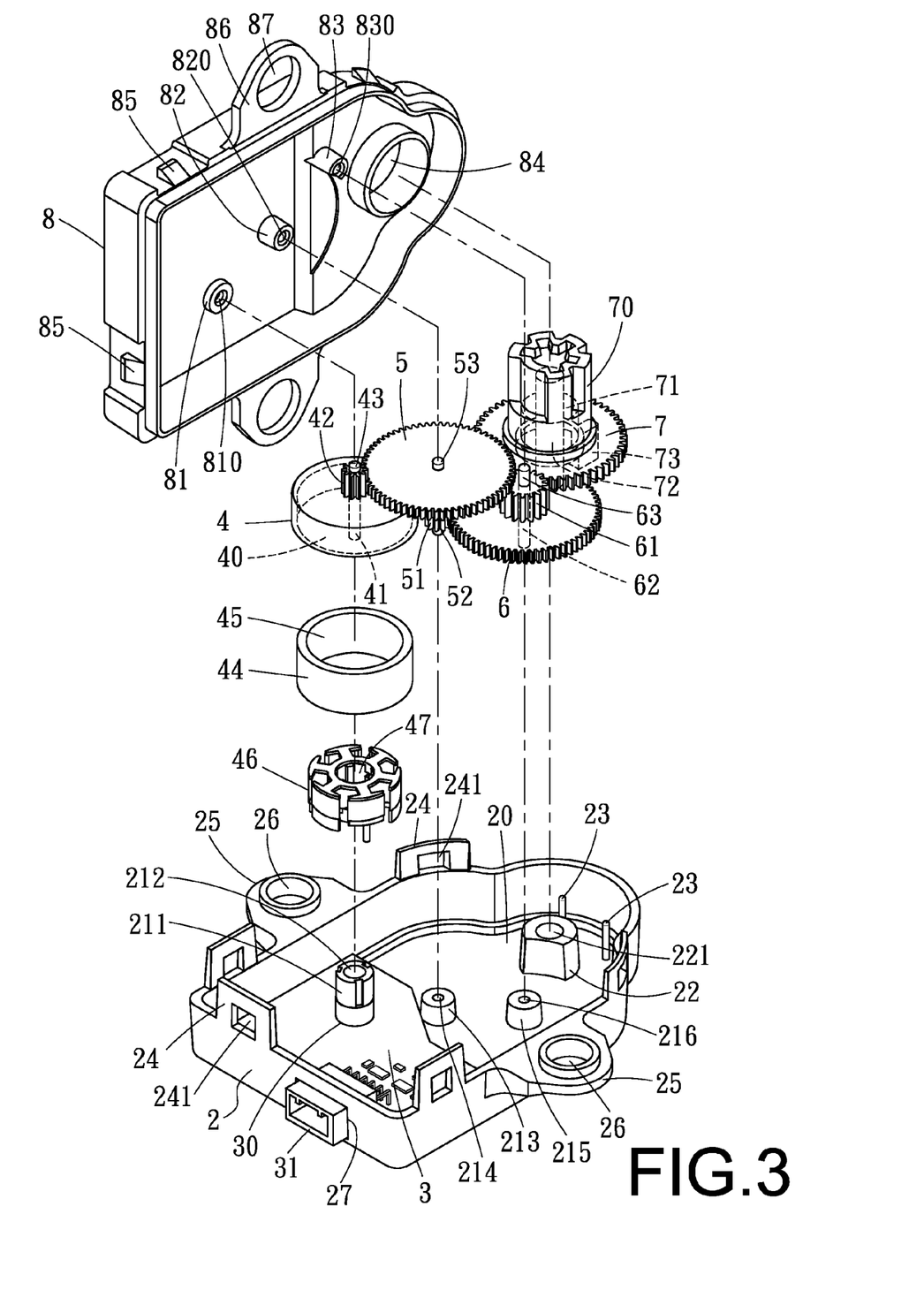
FIG. 3 is an exploded perspective view of a preferred embodiment of a brushless motor in the present invention.
Figure 4:
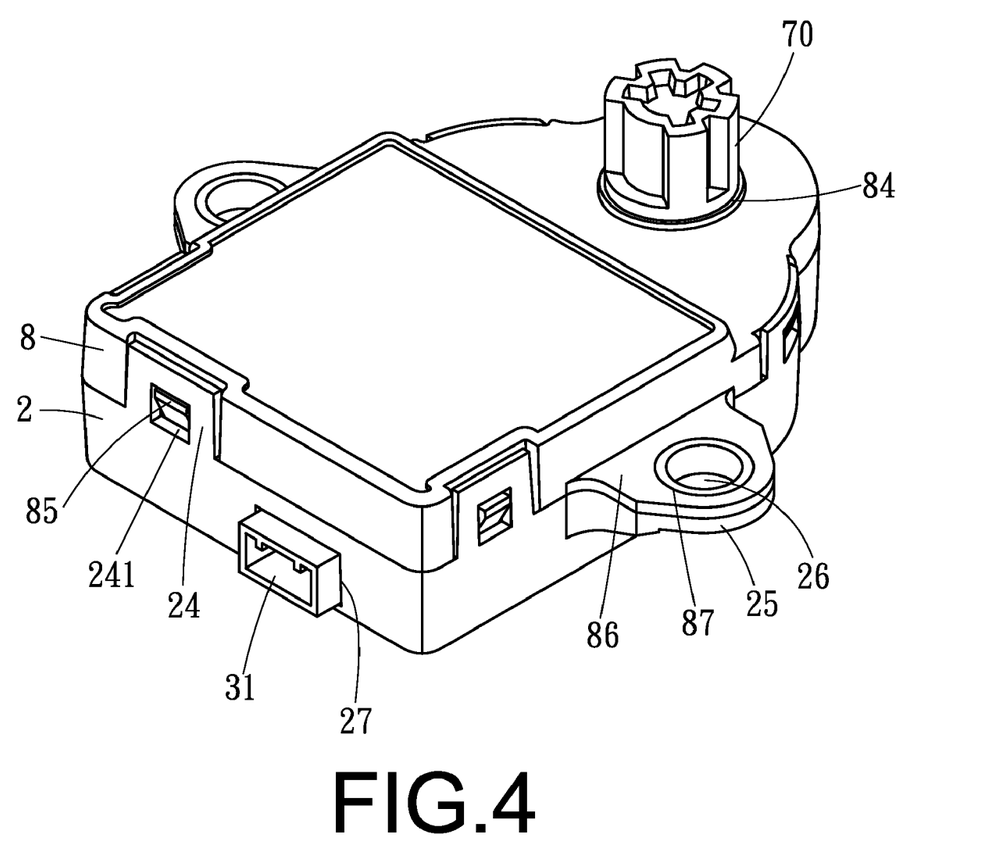
FIG. 4 is a perspective view of the preferred embodiment of a brushless motor in the present invention.
Figure 5:
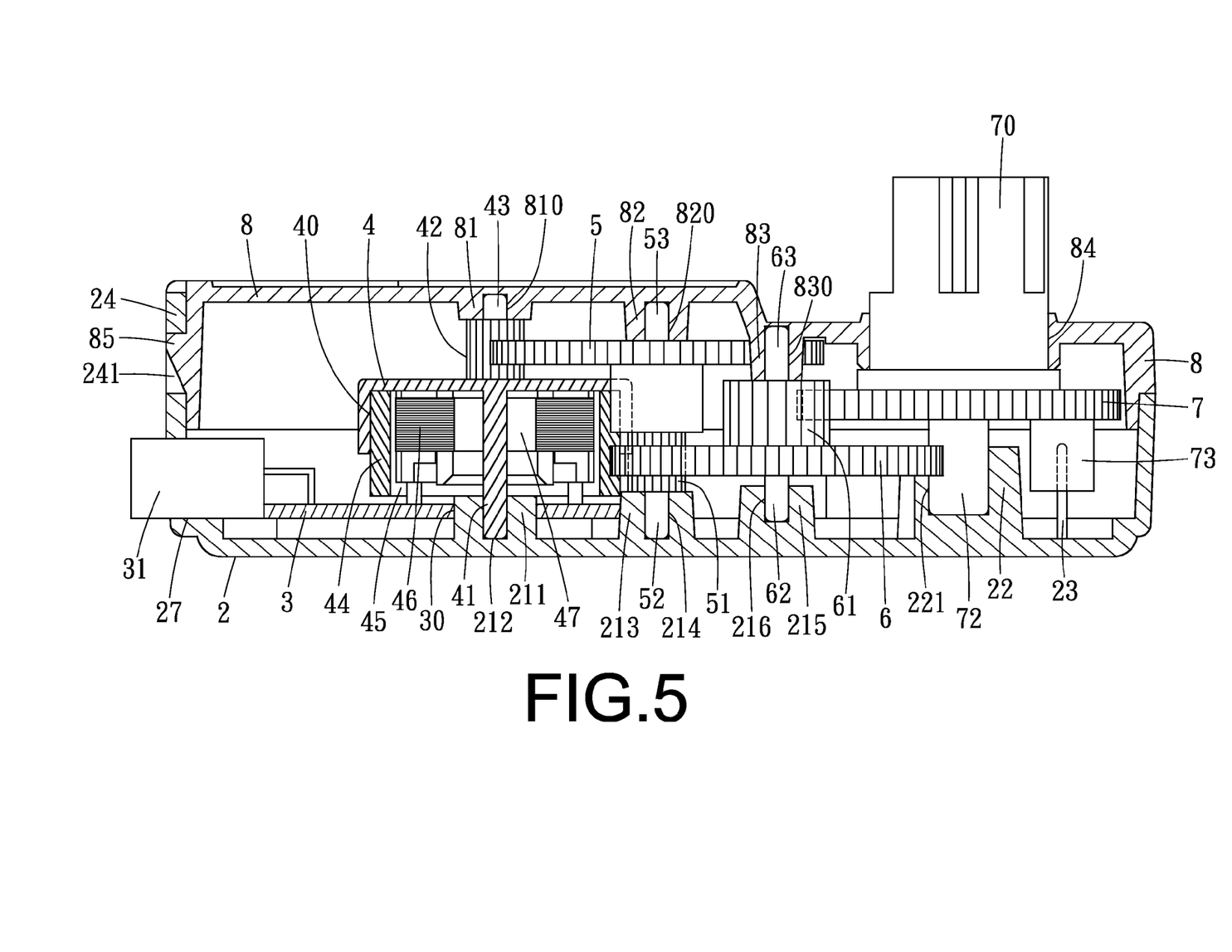
FIG. 5 is a side cross-sectional view of the preferred embodiment of a brushless motor in the present invention.

Commonly, as shown in FIGS. 1 and 2, a conventional brushless motor 1 employed to turn around a head light of an automobile to alter its lighting direction is mainly composed of a bottom base 10, a circuit board 11, a rotator 12, a big gear 13, a big driven gear 14, a driving wheel 15 and a lid 16. The bottom base 10 is provided with a chamber 100, plural locking projections 101 protruded around its circumference, a positioning ear 102 formed at its two corresponding sides respectively, a through hole 103 bored in each positioning ear 102, and a blocking wall 104 correspondingly formed at two corners of the chamber 100. The circuit board 11 is installed in the chamber 100, provided with a plugging set 110. The rotator 12 is installed in the chamber 100 to be positioned above the circuit board 11, provided with a driving gear 120 located at its central top, a magnet 121 fixed in the rotator 12, and a coil 122 installed in the magnet 121. The big gear 13 is engaged with the driving gear 120 of the rotator 12, provided with a little gear 130 positioned at its bottom. The big driven gear 14 is engaged with the little gear 130, provided with a little driven gear 140 located at its top. The driving wheel 15 is provided with a toothed portion 150 formed as a sector for engaging with the little driven gear 140, and a driving shaft 151 formed upright on its top. The lid 16 is covered on the base 10, provided with a through hole 160 for the driving shaft 151 to pass through, plural locking plates 161 spaced apart in its circumference, a locking hole 162 bored in each of the locking plates 161 for engaging with the locking projections 101 of the base 10, a positioning ear 163 formed at its two sides respectively, and a through hole 164 bored in each of the positioning ears 163.

In using, when the toothed portion 150 of the driving wheel 15 is driven to turn around, it is to be stopped by the blocking wall 104, as shown in FIG. 2, so that the head light of an automobile can be turned for a preset angle. However, if different angle changes are required, various molds of the toothed portion 150 have to be prepared to manufacture diverse rotating angles of the driving wheel 15, causing an increase of manufacturing cost.

SUMMARY OF THE INVENTION

The objective of this invention is to offer a brushless motor manufactured by a single mold to have a variety of rotating angles for being used in different lamps, so as to reduce manufacturing cost.

The main feature of the invention is that at least two stopping posts are formed around a rotating shaft to form an included angle with the rotating shaft, and a positioning plate is formed at a bottom of a driving gear to be movably located between the at least two stopping posts that are employed to restrict a driving shaft to rotate in a preset angle.

Another feature of the invention includes a bottom base, a circuit board, a rotator, a big gear, a big driven gear, a driving gear and a lid. The bottom base is provided with a chamber, a shaft base installed in the chamber and bored with a shaft hole, plural locking plates formed around its circumference and respectively bored with a locking hole, a positioning ear respectively formed at its two corresponding sides and bored with a through hole, and an opening formed through its one sidewall. The circuit board is installed in the chamber of the bottom base and provided with a plugging set inserted in the opening of the bottom base. The rotator is installed in the chamber of the bottom base to be located above the circuit board and provided with a recess formed at its bottom, a driving gear positioned at its top, a magnet with a center through hole placed in the recess, and a coil deposited in the center through hole. The big gear is engaged with the driving gear of the rotator and provided with a small gear located at its bottom. The big driven gear is engaged with the small gear and provided with a small driven gear positioned at its top. The driving gear is engaged with the small driven gear and provided with a driving shaft located at its top and a rotating shaft located at its bottom. The lid is covered on the bottom base and provided with a through hole for the driving shaft to pass through, plural locking projections formed around its circumference, and a positioning ear respectively formed at its two corresponding sides and bored with a through hole.

BRIEF DESCRIPTION OF DRAWINGS

This invention is better understood by referring to the accompanying drawings, wherein.

DETAILED DESCRIPTION OF THE PREFERRED EMBODIMENT

As shown in FIGS. 3~7, a preferred embodiment of a brushless motor in the present invention includes a bottom base 2, a circuit board 3, a rotator 4, a big gear 5, a driven gear 6, a driving gear 7 and a lid 8.

The bottom base 2 is provided with a chamber 20 formed inside it, three positioning bars 211, 213 and 215 located inside the chamber 20 to be respectively cut with a positioning hole 212, 214 and 216, and a shaft base 22 bored with a shaft hole 221. There are two stopping posts 23 properly positioned around the shaft base 22 to form an included angle with the shaft base 22 such as 30° ˋ40° ˋ60° and 80°. Protruded upward around the bottom base 2 are plural locking plates 24 that are respectively formed with a locking hole 241. The bottom base 2 is also provided with a positioning ear 25 respectively formed at its two corresponding sides, and an opening 27 formed through its one sidewall. The positioning ears 25 are respectively bored with a through hole 26.

The circuit board 3 is installed in the chamber 20 of the bottom base 2, provided with a through hole 30 and a plugging set 31.

The rotator 4 is located above the circuit board 3 inside the chamber 20, provided with a recess 40 formed at its bottom, a supporting shaft 41 installed in the recess 40, a driving gear 42 fixed at the top of the supporting shaft 41, another supporting shaft 43 positioned on the driving gear 42, a magnet 44 with a center through hole 45 located in the recess 40, a coil 46 installed in the through hole 45, and a through hole 47 centrally bored through the coil 46.

The big gear 5 is engaged with the driving gear 42 of the rotator 4, provided with a small gear 51 located at its bottom, and two supporting shafts 52 and 53 respectively extended upward and downward at the center of the small gear 51.

The big driven gear 6 is engaged with the small gear 51, provided with a small driven gear 61 positioned at its top, and two supporting shafts 62 and 63 respectively extended upward and downward at the center of the small driven gear 61.

The driving gear 7 is engaged with the little driven gear 61, provided with a driving shaft 70 formed at its top, a recess 71 formed in the driving shaft 70, a rotating shaft 72 located in the recess 71, and a positioning plate 73 formed at its bottom.

The lid 8 is covered on the bottom base 2, provided with three positioning bars 81, 82 and 83 located inside it to correspond to the positioning bars 211, 213 and 215 of the bottom base 2, a through hole 84, plural locking projections 85 formed around its circumference, a positioning ear 86 respectively formed at its two corresponding sides, and a through hole 87 bored in each of the positioning ears 86. The positioning bars 81, 82 and 83 are respectively bored with a positioning hole 810, 820 and 830.

In assembly, as shown in FIGS. 3~7, the circuit board 3 is first installed in the chamber 20 of the bottom base 2, with the plugging set 31 placed in the opening 27 of the bottom base 2 and the through hole 30 fitting with the positioning bar 211 of the bottom base 2 to keep the circuit 3 fixed in the chamber 20 of the bottom base 2. The magnet 44 is next put in the recess 40 of the rotator 4 and the coil 46 is inserted in the through hole 45 of the magnet 44, with the supporting shaft 41 passing through the through hole 47 of the coil 46 to further fitting in the positioning hole 212 of the positioning bar 211 to keep the rotator 4 positioned in the chamber 20 of the bottom base 2. Then, insert the supporting shaft 62 located below the big driving gear 6 into the positioning hole 216 of the positioning bar 215 and insert the supporting shaft 52 located below the big gear 5 into the positioning hole 214 of the positioning bar 213, enabling the big gear 5 engaged with the driving gear 42 of the rotator 4 and the small gear 51 engaged with the big driving gear 6. The driving gear 7 is successively installed in the chamber 20 of the bottom base 2 by plugging the rotating shaft 72 of the driving gear 7 into the shaft hole 221 of the shaft base 22 to keep the driving gear 7 engaged with the little driven gear 61. The lid 8 is then covered on the bottom base 2, with the locking projections 85 of the lid 8 engaged in the locking holes 241 of the locking plates 24 to keep the lid 8 combined with the bottom base 2. By the time, the driving shaft 70 of the driving gear 7 is inserted through the through hole 84 of the lid 8; the positioning plate 73 of the driving gear 7 is located between the stopping posts 23; the supporting shaft 43 of the rotator 4 is inserted in the positioning hole 810 of the lid 8; the supporting shaft 53 of the big gear 5 is plugged in the positioning hole 820 of the lid 8; the supporting shaft 63 of the little driven gear 61 is inserted stably in the positioning hole 830 of the lid 8. Therefore, a complete assembly of the invention is finished.

Figure 6:
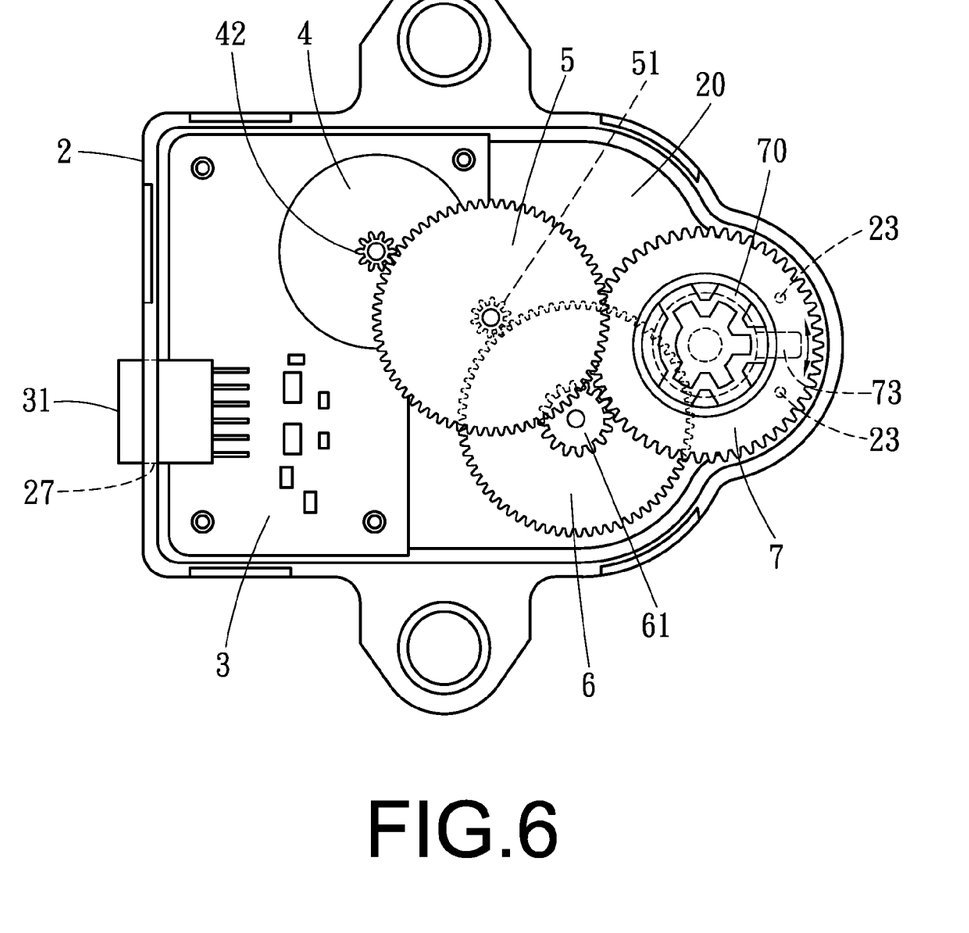
FIG. 6 is a top view of the preferred embodiment of a brushless motor in the present invention, showing an included angle for rotating with 60°.
Figure 7:
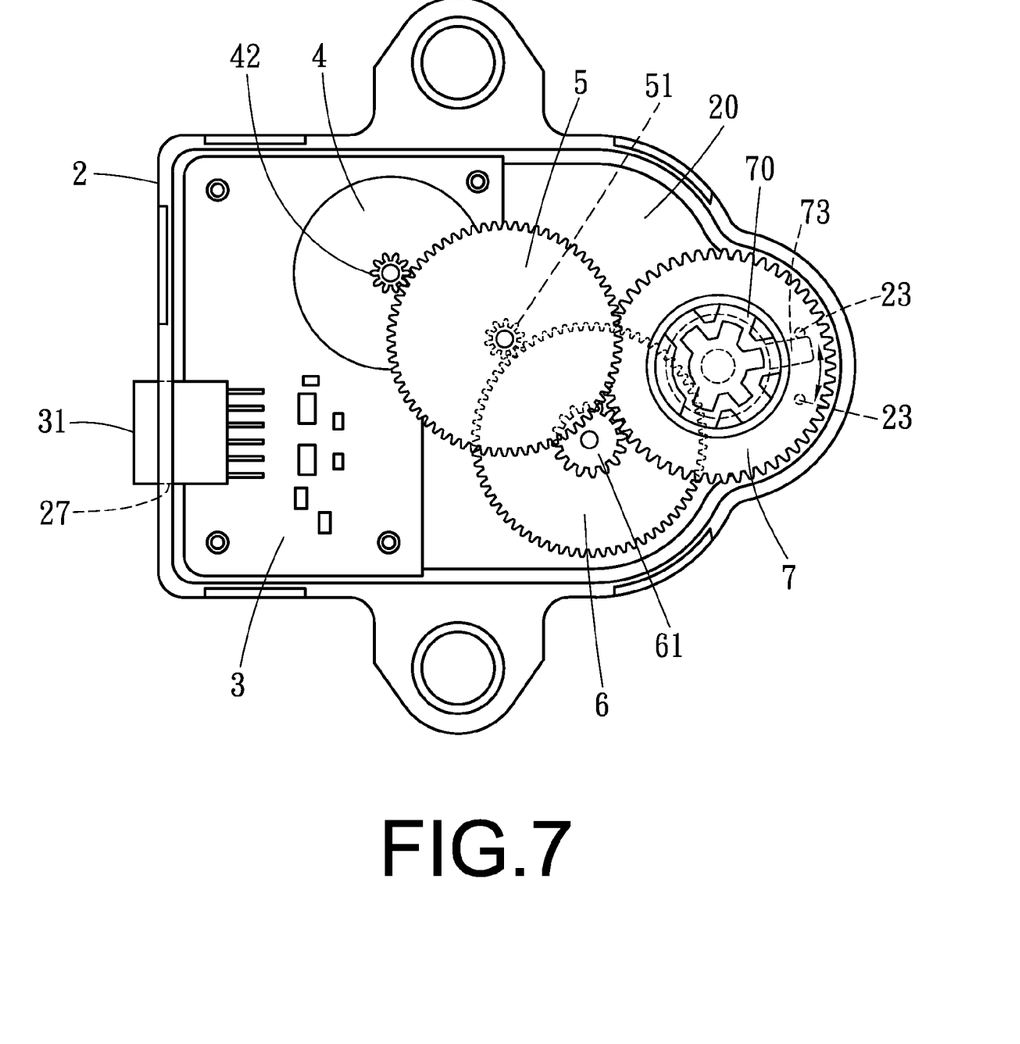
FIG. 7 is a top view of the preferred embodiment of a brushless motor in the present invention, showing it being rotated with an included angle of 40°.
Figure 8:
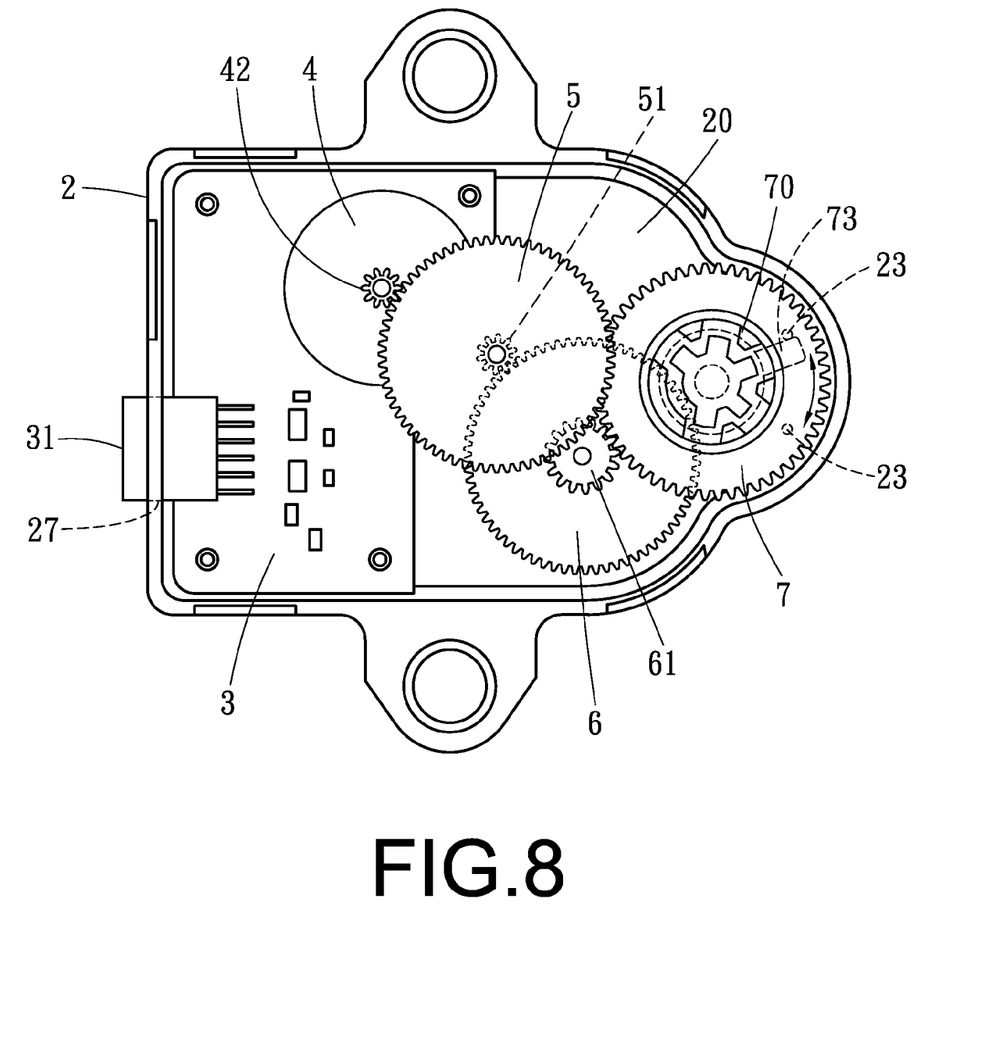
FIG. 8 is a top view of the preferred embodiment of a brushless motor in the present invention, showing it being rotated with an included angle of 80°.
Figure 9:
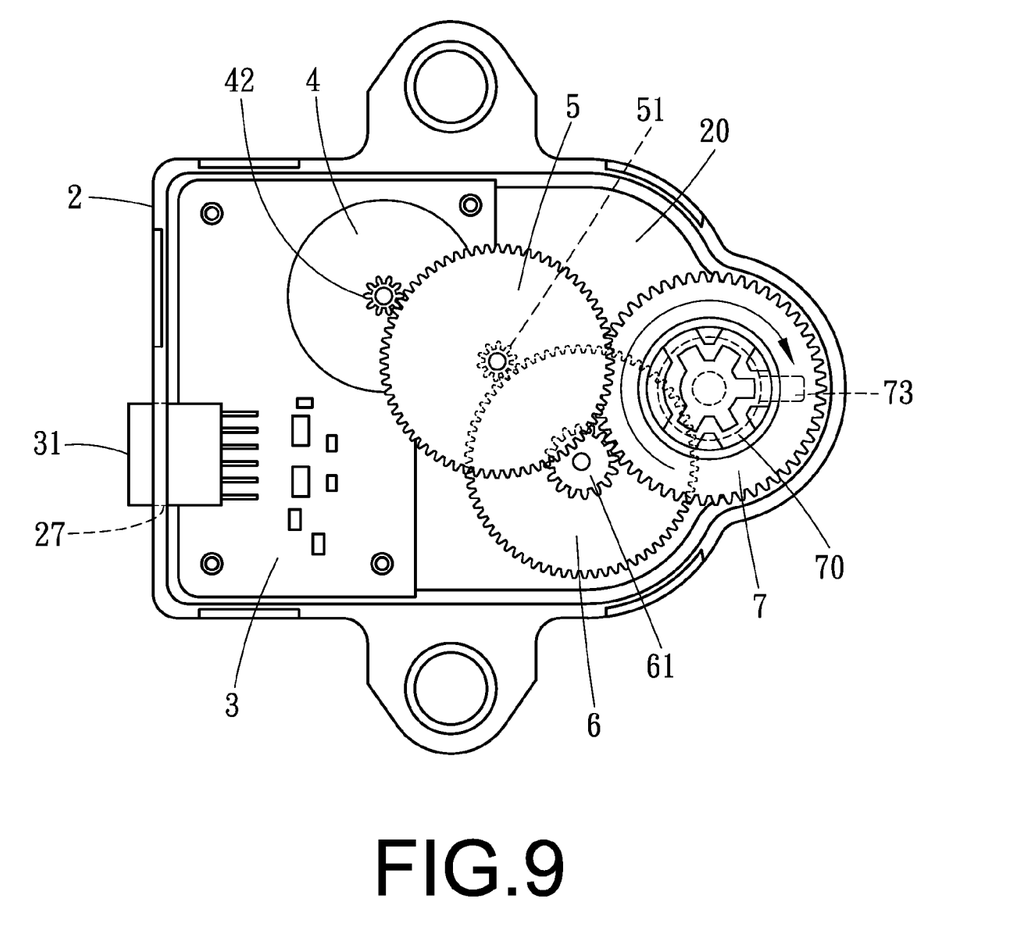
FIG. 9 is a top view of the preferred embodiment of a brushless motor in the present invention, showing it able to be rotated with 360°.

According to the present invention, various bottom bases 2 with diverse rotating angles of the driving shaft 7 can be made by only one mold. That is, there are plural pairs of post holes of the stopping posts 23 designed in the mold of the bottom base 2. In manufacturing, if a rotating angle of 60° is desired, seal up all pairs of the post holes except that with an included angle of 60°, so that only the stopping posts 23 having an included angle of 60° can be formed while injecting the mold, as shown in FIG. 6. Likewise, in case that a rotating angle of 40° is desired, seal up all pairs of the post holes except that with an included angle of 40°, so that only the stopping posts 23 having an included angle of 40° can be formed while injecting the mold, as shown in FIG. 7. Or, when a rotating angle of 80° is desired, seal up all pairs of the post holes except that with an included angle of 80°, so that only the stopping posts 23 having an included angle of 80° can be formed while injecting the mold, as shown in FIG. 8. As for an angle of 360°, it just needs to seal up all of the post holes to make the bottom base 2 without the stopping posts 23, as shown in FIG. 9. So, by means of the single mold to form the bottom base 2 with different angles of the stopping posts 23, the brushless motor can be selectively installed with the bottom base 2 with diverse rotating angles to meet various requirements of different lamps such as head lights of an automobile, stage lights and a warning light, with a low cost and convenient installation.

When the angle of a head light of an automobile is to be altered, the plugging set 31 has to be first connected with an exterior power line to electrify the coil 46 to generate a magnetic field to enable the magnet 44 to rotate rightward, so as to simultaneously keep the rotator 4 whirled. By the time, the driving gear 42 of the rotator 4 is to drive the big gear 5 to turn around to consecutively keep the big driven gear 6 driven by the small gear 51 of the big gear 5 and the driving gear 7 driven by the small driven gear 61 of the big driven gear 6 to rotate rightward to enable the positioning plate 73 moved until being stopped by the stopping post 23 of the bottom base 2. As the positioning plate 73 is blocked by the stopping post 23, the coil 46 is to be immediately commanded by the circuit board 3 to generate a reverse magnetic field to enable the magnet 44 and the rotator 4 to rotate reversely. By the time, the driving gear 42 of the rotator 4 is to drive the big gear 5 to turn around to consecutively keep the big driven gear 6 driven by the small gear 51 of the big gear 5 and the driving gear 7 driven by the small driven gear 61 of the big driven gear 6 to whirl reversely to enable the positioning plate 73 moved until being stopped by the other stopping post 23 of the bottom base 2. With the alternate shift of rotating direction, the driving shaft 70 of the driving gear 7 can thus drive the head light of an automobile to turn around.

While the preferred embodiment of the invention has been described above, it will be recognized and understood that various modifications may be made therein and the appended claims are intended to cover all such modifications that may fall within the spirit and scope of the invention.

What is claimed is:

1. A brushless motor have a variety of rotating angles for being used in different lamps, comprising:
   a bottom base (2) provided with a chamber (20) formed inside therein, three positioning bars (211, 213 and 215) being located inside the chamber (20) to be respectively formed with a positioning hole (212, 214 and 216), and a shaft base (22) being bored with a shaft hole (221); two stopping posts (23) being properly positioned around the shaft base (22) to form an inclined angle with the shaft base (22); a plurality of locking plates (24) protruding upward around the bottom base (2); each locking plate being formed with a locking hole (241); two sides of the bottom base (2) being provided with positioning ears (25), respectively, and an opening (27) formed through one sidewall of the bottom base (2); each positioning car (25) being formed with a through hole;

a circuit board (3) installed in the chamber (20) of the bottom base (2), provided with a through hole (30) and a plugging set (31);

a rotator (4) located above the circuit board (3) and inside the chamber (20), a bottom of the rotator being formed with a recess (40); a supporting shaft (41) installed in the recess (40), a driving gear (42) fixed at a top of the supporting shaft (41), another supporting shaft (43) positioned on the driving gear (42), a magnet (44) with a center through hole (45) located in the recess (40), a coil (46) installed in the through hole (45), and a through hole (47) centrally bored through the coil (46);

a big gear (5) engaged with the driving gear (42) of the rotator (4), provided with a small gear (51) located at a bottom thereof, and two supporting shafts (52) and (53) respectively extended upward and downward at the center of the small gear (51);

a big driven gear (6) engaged with the small gear (51) and provided with a small driven gear (61) positioned at a top thereof, and two supporting shafts (62 and 63) respectively extending upward and downward at a center of the small driven gear (61);

a driving gear (7) engaged with the little driven gear (61) and provided with a driving shaft (70) formed at a top thereof; the driving gear (7) having teeth around a cycle; a recess (71) being formed in the driving shaft (70), a rotating shaft (72) being located in the recess (71), and a positioning plate (73) formed at its bottom; and a lid (8) covered on the bottom base (2) and provided with three positioning bars (81, 82 and 83) located inside thereof to correspond to the positioning bars (211, 213 and 215) of the bottom base (2), a through hole (84), plural locking projections (85) formed around its circumference, each of two sides of the lid (8) having a positioning ear (86), and each positioning ear (86 having a through hole (87; the positioning bars (81, 82 and 83) being formed with a positioning hole (810, 820 and 830), respectively.

* * * * *